US008696135B2

(12) United States Patent
Yoon et al.

(10) Patent No.: US 8,696,135 B2
(45) Date of Patent: Apr. 15, 2014

(54) VIDEO RECORDING PREVENTION SYSTEM

(75) Inventors: Youngshik Yoon, Valencia, CA (US);
Pascal Bourdon, Le Grand Fougeray (FR); Laurent Blondé, Thorigne-Fouillard (FR); Didier Doyen, La Bouexiere (FR)

(73) Assignee: Thomson Licensing, Boulogne-Billancourt (FR)

( * ) Notice: Subject to any disclaimer, the term of this patent is extended or adjusted under 35 U.S.C. 154(b) by 435 days.

(21) Appl. No.: 12/452,308

(22) PCT Filed: Feb. 19, 2008

(86) PCT No.: PCT/US2008/002145
§ 371 (c)(1),
(2), (4) Date: Dec. 23, 2009

(87) PCT Pub. No.: WO2009/002369
PCT Pub. Date: Dec. 31, 2008

(65) Prior Publication Data
US 2010/0104260 A1    Apr. 29, 2010

(30) Foreign Application Priority Data
Jun. 25, 2007  (EP) .................... 07301147

(51) Int. Cl.
*G03B 21/00*  (2006.01)
(52) U.S. Cl.
USPC ............. 353/31; 353/20; 353/30; 353/84; 353/85; 353/99; 353/122; 349/106; 349/115; 359/634

(58) Field of Classification Search
USPC ......... 353/30, 31, 33, 34, 37, 38, 81, 84, 85, 353/98, 99, 122; 380/4, 54, 25, 23, 28; 359/204.211, 490, 501, 502, 634; 348/742, 743, 273, 276–280, 268–271; 349/9, 8, 7, 5, 18, 97, 106, 115, 117
See application file for complete search history.

(56) References Cited

U.S. PATENT DOCUMENTS

| 3,704,061 | A | 11/1972 | Travis |
| 5,517,340 | A | 5/1996 | Doany et al. |
| 5,555,035 | A | 9/1996 | Mead et al. |
| 5,903,304 | A | 5/1999 | Deter |
| 6,250,763 | B1 | 6/2001 | Fielding et al. |
| 6,266,105 | B1 * | 7/2001 | Gleckman ............ 348/743 |
| 6,280,034 | B1 * | 8/2001 | Brennesholtz ........ 353/20 |
| 6,515,734 | B1 | 2/2003 | Yamada et al. |

(Continued)

FOREIGN PATENT DOCUMENTS

| CN | 1342022 |   | 3/2002 |
| CN | 1424623 | A | 6/2003 |

(Continued)

OTHER PUBLICATIONS

International Search Report, dated Aug. 12, 2008.

*Primary Examiner* — Sultan Chowdhury
(74) *Attorney, Agent, or Firm* — Robert D. Shedd; Richard LaPeruta

(57) ABSTRACT

A projector has at least four primary color components controlled to produce a metameric effect image which is not perceptible to the human optical system and is perceptible to a video recording device.

18 Claims, 3 Drawing Sheets

(56) References Cited

U.S. PATENT DOCUMENTS

| | | |
|---|---|---|
| 6,644,813 B1 | 11/2003 | Bowron |
| 6,648,475 B1 | 11/2003 | Roddy et al. |
| 6,799,851 B2 * | 10/2004 | Yoon ................................ 353/84 |
| 6,813,087 B2 * | 11/2004 | Davis ............................ 359/634 |
| 6,830,342 B2 * | 12/2004 | Lee ................................. 353/84 |
| 6,863,400 B1 * | 3/2005 | Liang .............................. 353/20 |
| 6,886,943 B1 | 5/2005 | Greenberg et al. |
| 7,018,045 B2 | 3/2006 | Tomita |
| 7,048,381 B2 * | 5/2006 | Kim et al. ........................ 353/38 |
| 7,125,123 B2 * | 10/2006 | Kwon et al. ..................... 353/84 |
| 7,210,788 B2 | 5/2007 | Lee et al. |
| 7,230,656 B2 * | 6/2007 | Penn et al. ..................... 348/743 |
| 7,386,125 B2 * | 6/2008 | Bilobrov et al. .............. 380/201 |
| 7,515,746 B2 | 4/2009 | Pettitt |
| 7,794,092 B2 | 9/2010 | Drazic et al. |
| 7,862,182 B2 | 1/2011 | Thollot et al. |
| 2001/0024268 A1 | 9/2001 | Fielding et al. |
| 2002/0008770 A1 | 1/2002 | Ho et al. |
| 2002/0051094 A1 | 5/2002 | Makita |
| 2003/0197837 A1 * | 10/2003 | Gyu Lee .......................... 353/84 |
| 2004/0057022 A1 * | 3/2004 | Song ................................ 353/84 |
| 2004/0100589 A1 | 5/2004 | Ben-David et al. |
| 2004/0119947 A1 * | 6/2004 | Kim et al. ........................ 353/31 |
| 2004/0130682 A1 | 7/2004 | Tomita |
| 2004/0184005 A1 | 9/2004 | Roth |
| 2004/0233342 A1 | 11/2004 | Kim et al. |
| 2005/0088629 A1 | 4/2005 | Greenberg et al. |
| 2005/0162615 A1 | 7/2005 | Penn |
| 2005/0168708 A1 * | 8/2005 | Huang ............................. 353/81 |
| 2005/0206846 A1 * | 9/2005 | Yeung et al. .................... 353/20 |
| 2005/0237487 A1 | 10/2005 | Chang |
| 2006/0038964 A1 | 2/2006 | Lu et al. |
| 2006/0039068 A1 | 2/2006 | Tokita et al. |
| 2006/0044525 A1 | 3/2006 | Lee et al. |
| 2006/0119795 A1 | 6/2006 | Lippey et al. |
| 2006/0152524 A1 | 7/2006 | Miller et al. |
| 2006/0203209 A1 * | 9/2006 | De Vaan ........................... 353/84 |
| 2006/0220199 A1 | 10/2006 | Duboc et al. |
| 2006/0290777 A1 | 12/2006 | Iwamoto et al. |
| 2007/0014114 A1 | 1/2007 | Barazza |
| 2007/0139624 A1 | 6/2007 | DeCusatis et al. |
| 2007/0195275 A1 | 8/2007 | Drazic et al. |
| 2007/0273835 A1 | 11/2007 | Fan et al. |
| 2008/0151354 A1 | 6/2008 | Mehrl |
| 2009/0108182 A1 * | 4/2009 | Thiebaud et al. ............. 250/215 |
| 2009/0140974 A1 * | 6/2009 | Maeda ........................... 345/102 |
| 2010/0014008 A1 | 1/2010 | Yoon |
| 2010/0026959 A1 | 2/2010 | Yoon et al. |
| 2010/0104260 A1 | 4/2010 | Yoon et al. |
| 2010/0315596 A1 | 12/2010 | Yoon |
| 2011/0013143 A1 | 1/2011 | Yoon |

FOREIGN PATENT DOCUMENTS

| | | |
|---|---|---|
| CN | 1721916 | 1/2006 |
| DE | 19626097 | 10/1997 |
| EP | 1220549 A2 | 7/2002 |
| EP | 1317148 A1 | 6/2003 |
| FR | 2872924 | 1/2006 |
| JP | 8289218 | 1/1996 |
| JP | 10268230 | 10/1998 |
| JP | 11-505334 A | 5/1999 |
| JP | 2001306023 | 11/2001 |
| JP | 2002-287247 A2 | 10/2002 |
| JP | 2004144907 | 5/2004 |
| JP | 2004-205919 A2 | 7/2004 |
| JP | 2004286964 | 10/2004 |
| JP | 2005241904 | 9/2005 |
| JP | 2006-58588 A | 3/2006 |
| JP | 2006-276311 A2 | 10/2006 |
| JP | 2007-017536 A2 | 1/2007 |
| JP | 2007127856 | 5/2007 |
| JP | 2007-519372 A | 7/2007 |
| JP | 2008506142 | 2/2008 |
| KR | 1020060019381 | 3/2006 |
| WO | WO9800746 | 1/1998 |
| WO | WO0191471 | 11/2001 |
| WO | WO2004040899 | 5/2004 |
| WO | WO2005025215 | 3/2005 |
| WO | 2005/074258 A1 | 8/2005 |
| WO | WO2006057001 | 6/2006 |
| WO | WO2006118881 | 11/2006 |

* cited by examiner

VIDEO RECORDING PREVENTION SYSTEM

CROSS-REFERENCE TO RELATED APPLICATIONS

This application relates to U.S. application Ser. Nos. 12/448,338 filed on Jun. 17, 2009 which published as US 2010-0026910A1; 12/448,320 filed on Jun. 17, 2009 which published as US 2010-0014008A1; 12/312,998 filed on Jun. 3, 2009 which published as US 2010-0315596A1; 12/448,002 filed on Jun. 3, 2009 which published as US 2010-0026959A1; and 12/450,683 filed on Oct. 6, 2009 which published as US20110013143A1.

FIELD OF THE INVENTION

This application claims the benefit, under 35 U.S.C. §365 of International Application PCT/US2008/002,145, filed 25 Apr. 2007, which was published in accordance with PCT Article 21(2) on 31 Dec. 2008, in English, which claims the benefit of European patent application No. 07301147.0 filed 25 Jun. 2007.

The invention relates to a video recording prevention system. In particular, the invention relates to a metamerism based video recording prevention projector where metamer is defined as one of at least two different spectral combinations which result in the same perceived color.

BACKGROUND OF THE INVENTION

The advent of highly portable camcorders has enabled moviegoers to wrongfully and surreptitiously capture the video content of movies displayed in theaters. In an effort to combat such activities, some theaters have incorporated systems for preventing recording of movie content or degrading video captured by camcorders. The approaches have varied, but each has attempted to exploit the differences between the optical technology of camcorders and the human optical system. For example, some theaters have employed the use of ultraviolet or infrared light, both of which are invisible to the human optical system but detectable and recordable by typical camcorders. Unfortunately, the use of ultraviolet and/or infrared light to prevent or degrade recording video recording may be easily nullified when a moviegoer incorporates an appropriate spectral filter with his camcorder. Another attempt at preventing video recording is the use of frequency modulation which may deliver, for example, a copyright infringement warning detectable and recordable by typical camcorders as part of video degradation. Unfortunately, the frequency modulation method may introduce a flicker visible to the human optical system which results in an unpleasant viewing experience for the audience.

Where both a theater projection system and a camcorder operate based on the RGB color space, information of the pixel input ($[R_I\ G_I\ B_I]$) to the RGB based projector which is processed by the projector mechanism (MP) may be shown as accurately transferable to the pixel output ($[R_O\ G_O\ B_O]$) of the RGB based camcorder which is processed by the camcorder mechanism (MC). Accordingly, another attempt to prevent unauthorized video recording of movie content was made by introducing an extra primary color (which can involve the use of a second projector) so that different projected spectral combinations can be metamers and can be incompatible with typical camcorders. (In simplest terms, a "metamer" is a color that is different than another color, but yet appears to be the same color as the other to an observer and "metamerism" is the use of metamers such that two or more different colors (i.e. metamers) are perceived as the same color to the observer.) This technique takes advantage of the differing spectral sensitivity curves of the RGB camcorder and the typical human optical system. The addition of the fourth primary color allows the projectionist to display a movie with a spectral combination of four primary colors which are perceived by the moviegoer generally as originally intended by the movie producer because of the nature of metamerism (i.e. there is a plurality of spectral power distributions that will be perceived by the human eye as the same color, but will "result in different values in a video camera" as described in WO 2004/0408989 A2). The use of a second projector may result in synchronization problems with the primary projector. Further, the introduction of only a single extra primary color results in only one-dimensional metamerism which could be the easiest form of metamerism to circumvent through linear, single, or conventional equation solutions.

It is therefore desirable to develop an improved video recording prevention system.

SUMMARY OF THE INVENTION

The present invention is directed to a projector having at least four primary color components controlled to produce an image that a human eye and a camcorder perceive very differently.

DETAILED DESCRIPTION OF THE INVENTION

Figure 1A:
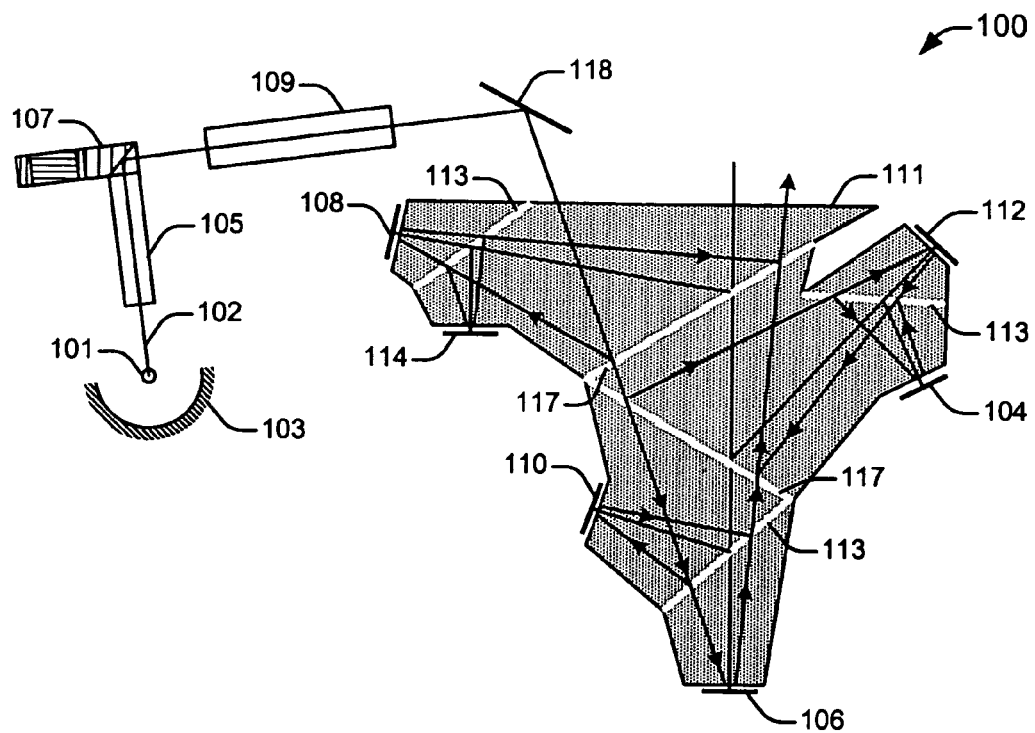
FIGS. 1A and 1B are a schematic illustration of a six primary color prism projector according to the present invention.

Referring now to FIG. 1A in the drawings, a projector according to the present invention is illustrated. Projector 100 can comprise a light source 101 having a reflector 103, a directional light transmission device 105, an optional filter drum 107 (which is shown in greater detail in FIG. 1B), relay optics 109, a six primary color prism 111, and imager devices 104, 106, 108, 110, 112, 114, which are variously referred to as digital micromirror devices, micromirror devices, micromirror array devices, or microdisplay devices. The color division of the six primary color prism 111 can be accomplished by introducing dichroics 113 (which are also referred to as dichroic prisms or color splitters) and additional beam splitting components 117 which further split the different color light components, as shown in FIG. 1A. Each primary is then delivered to a corresponding micromirror device. The use of six primaries provides a wider color gamut and greater color control at a given refresh or frame rate. In an example arrangement, a cyan, blue, yellow, green, red, and orange color components are directed toward and reflected from respective micromirror devices. Particularly, micromirror device 104 reflects a red color component of light beam 102, micromirror device 106 reflects a green color component of light beam 102, micromirror device 108 reflects a blue color component of light beam 102, micromirror device 110 reflects a yellow color component of light beam 102, micromirror device 112 reflects an orange color component of light beam 102, and micromirror device 114 reflects a cyan color component of light beam 102. In operation, light source 101 emits a light beam 102 into directional light transmission device 105 which then directs the light through a filter drum 107, which can have optional polarization optics for potential three dimensional (3D) capability. The light beam 102 then travels through relay optics 109 which direct the light beam 102 into prism 111. FIG. 1A also shows the use of mirror 118 which can be use with the relay optics to steer the light beam into the prism 111. As described above, the color components of light beam 102 are then subsequently directed out of prism 111 by micromirrors 104, 106, 108, 110, 112, and 114 and eventually onto a display surface (not shown).

Figure 1B:
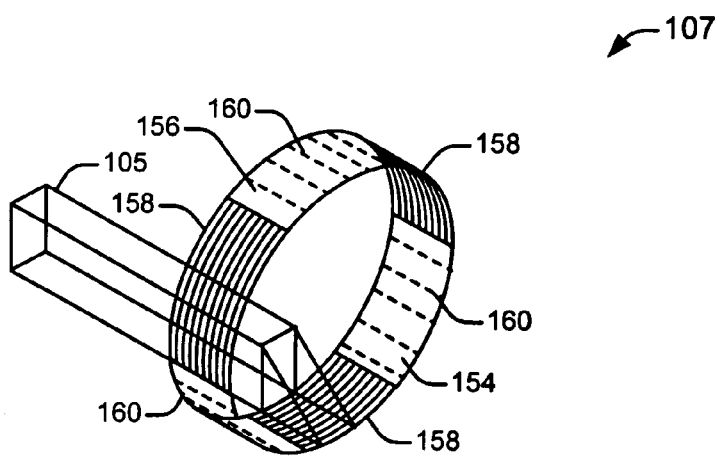

Referring now to FIG. 1B in the drawings, a filter device or drum 107 (also referred to as a polarization hollow cylinder) is illustrated. The filter device or drum 107 can be a rotatable drum-like structure formed of translucent materials. Although the filter device can have other geometries such as a planar wheel structure, a drum structure is presently preferred and as such, the expression "drum" will be consistently used in the following description. Drum 107 is shown as a flat band of material located in close proximity to a directional light transmission device (or light pipe) 105 for passing light through drum 107 by directing light generally orthogonal to an interior surface 154 of the drum 107 such that light passes through the translucent material and exits the drum 107 through an exterior surface 156 of the drum 107, i.e. through a wall of the drum. As shown, the drum is divided into radially alternating P-polarization sections 158 and S-polarization sections 160. Alternatively, for example, the drum 107 can be divided into radially alternating clockwise and counter-clockwise polarization sections. In operation, a two dimensional (2D) image can be converted to a 3D image by transmitting the 2D image through the directional light transmission device 105 and subsequently through the polarization drum 107 while drum 107 is rotated about its central axis. The drum 107 is rotated at a controlled speed so as to appropriately polarize each frame of images as either P-polarization or S-polarization by passing the image through sections 158, 160, respectively. The 3D image is perceived by a viewer of the projected image when the viewer wears polarized filter glasses (not shown) which allow only one of the P and S polarized portions of light through the glasses to each eye of the viewer. The projector should present approximately twice the number of frames per second in 3D mode as opposed to a normal 2D mode since each eye will only see every other frame. Different embodiments of the invention include all combinations of features disclosed which also have the filter device or drum 107.

Figure 2:
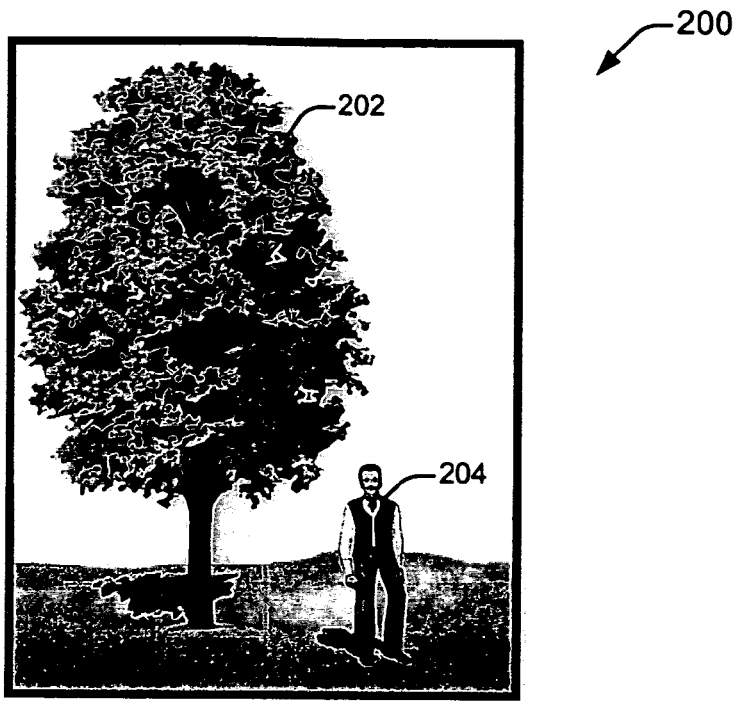
FIG. 2 is an illustration of an image projected from the six primary color prism of FIG. 1 as perceived by a typical human optical system.

Referring now to FIG. 2, projector 100 can be incorporated into a theater projection system so that the six primary colors are used in combination to provide a projected image as shown. FIG. 2 illustrates an image 200 comprising a human FIG. 202 standing next to a tree 204. FIG. 2 represents the projected image as the image would be perceived by a moviegoer with a typical human optical system, for example, with typical eyesight and no colorblindness. It will be appreciated that FIG. 2 is perceived by the moviegoer in substantially the form intended by the producer of the movie or image being projected.

Figure 3:
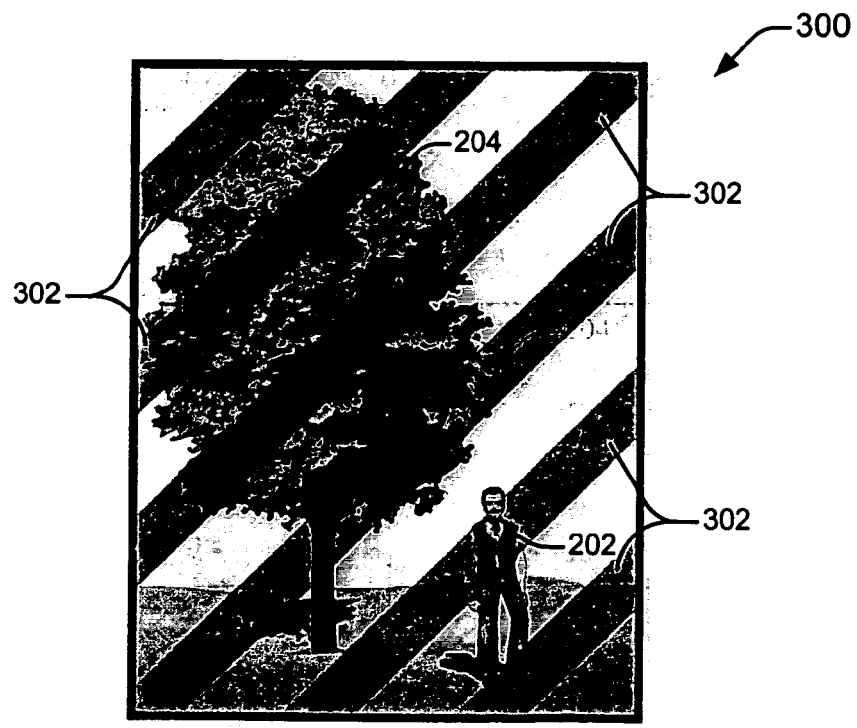
FIG. 3 is an illustration of the projected image of FIG. 2 as would be captured by a video recording device.

Referring now to FIG. 3, the same light being emitted from prism 100 and used to create the image 200 as perceived by a moviegoer as illustrated in FIG. 2 will be captured by a video recording device in a substantially degraded manner. It should be noted that the use of the expression "video recording device" is intended to include any type of color video recording devices such as portable camcorders. Specifically, FIG. 3 illustrates an image 300 which comprises not only the human FIG. 202 standing next to a tree 204 but also the presence of substantially diagonal stripes 302 integrated into the image 300. This duality of differing perceptions of different images from the same source, between the human moviegoer and the video recording device, is referred to as a metamerism effect and is related to the differing spectral sensitivity curves of those systems. In other words, the colors of some of the regions in the background in FIG. 3 appear to have the same color to the human; however, the different regions are intentionally composed of different spectral power distributions, such that the video recording device will not see these regions as metamers. In other words, the video recording device will see different colors as shown in FIG. 3.

When preparing a movie for use with a projector having a prism 100, the metamerism effects (such as diagonal stripes 302) perceived by video recording devices but not moviegoers can be produced by controlling the digital micromirror devices 104, 106, 108, 110, 112, and 114 so that any number of different images or varieties of degradation may be provided.

Figure 4:
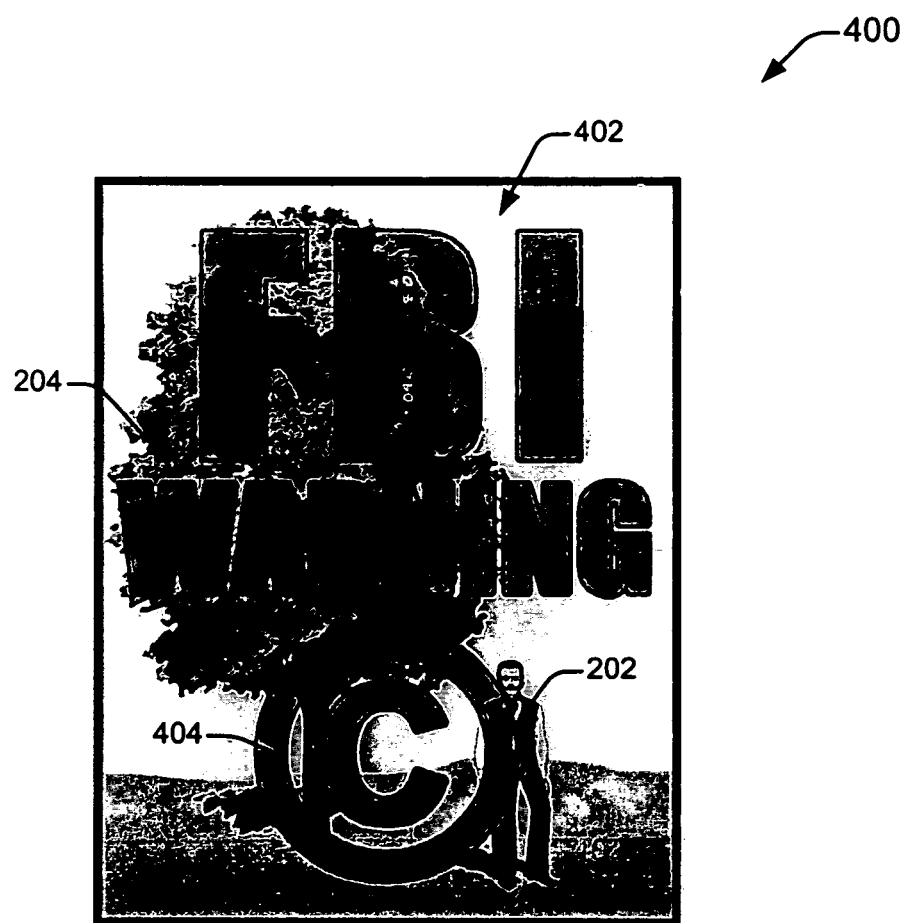
FIG. 4 is an illustration of an alternative image projected from the six primary color prism of FIG. 1 as would be captured by a video recording device.

Referring now to FIG. 4 in the drawings, it is shown that an image projected by a projector having a prism 100 may cause a moviegoer to see an image substantially similar to image 200 while a video recording device captures a different image. Specifically, the metamerism effect may be used to cause a video recording device to capture an image 400 comprising legible messages in the form of text 402 and/or graphics 404. In image 400, the text 402 is "FBI WARNING" and the graphic 404 is a copyright symbol. These types of degradations serve not only to lessen the quality of the captured image with respect to the way the producer of the movie intended for the movie to be viewed by a moviegoer, but are also capable of explicitly warning against illegal copying of the captured video. However, it will be appreciated that in alternative embodiments of the present invention, the metamerism effect can be utilized to produce an image captured by a video recording device that merely comprises unpleasant or different coloring from the image to be viewed by moviegoers.

Since the prism 100 of the present invention is incorporated into a single projector, there is no problem with aligning, synchronizing, or otherwise simultaneously operating two projectors to produce a single image. Operation of one projector rather than two or more projectors equates to less work for a projectionist and higher reliability in producing a high quality image. Further, it will be appreciated that while FIGS. 1-4 describe metamerism effects generated using a six primary color prism 100 in a single projector, the present invention more generally includes the use of four or more primary colors in a single projector. However, when a four primary color projector is compared to a six primary color projector having a six primary color prism 100, it will be appreciated that the six primary color projector provides a wider color gamut. Further, the six primary color projector also offers an unlimited number of color combinations for providing relatively secure metamerism effects that are not easily circumvented by those who capture only the red, green, and blue components. More specifically, removing the metamerism effects from the captured image would require complex multi-dimensional equation analysis. In short, the use of the six primary color projector in combination with metamerism results in a low likelihood of success in illegal recording. Finally, while the present invention has been described with respect to using digital micromirror devices, the present invention applies equally to and may be incorporated with other technologies such as LCD, SXRD, D-ILA, and LCoS, regardless of the response times of the projection technologies.

Further, another aspect of the invention is to generate a look-up table from psychovisual experiments. The look-up table (which can be part of the projector) includes a substantial number of metamers from different spectral power distributions for some selected colors to be perceived by a human, by design. Having and using more than two metamers for some intended perceived colors will ensure that a video recording device will differently perceive the different spectral power distributions associated with the intended color to be perceived by the human eye. The projector can further have a processor that employs more than two different spectral power distributions. By using more than two metamers, it increases the chances that all video recording devices will be able to distinguish at least one pair of metamers.

The foregoing illustrates only some of the possibilities for practicing the invention. Many other embodiments are possible within the scope and spirit of the invention. For example, other devices or components which can serve as the functional equivalent of dichroics or color splitters in combination with other components of the projector are considered embodiments of the invention. Also, for example, the use of five primaries such as cyan, blue, yellow, green, and red color components is an embodiment of the invention. It is, therefore, intended that the foregoing description be regarded as illustrative rather than limiting, and that the scope of the invention is given by the appended claims together with their full range of equivalents.

The invention claimed is:

1. A projector comprising:
   a primary color prism having a plurality of color beam splitters configured to split a light beam into greater than three primary color components, wherein the color beam splitter divides the light beam into multiple beams which comprise the greater than three primary color components which differ in color and follow different paths;
   separate microdisplay devices for each of the primary color components; and
   an image of the primary color components having metamers for an output color that is indistinguishable to a human optical system and distinguishable to a video recording device.

2. The projector according to claim 1, further comprising a look-up table having more than two combinations of spectral power distributions of the primary color components for at least one the selected output colors.

3. The projector according to claim 1, wherein the metamers are perceptible by an RGB type video recording device.

4. The projector according to claim 2, wherein the metamers are perceptible by an RGB type video recording device.

5. The projector according to claim 1, wherein the image comprises diagonal stripes of metamers visible to the video recording device.

6. The projector according to claim 1, wherein the image comprises a message formed by different metamers visible to the video recording device.

7. The projector according to claim 2, wherein the projector has a processor designed to select and use more than two metamers in the look-up table for at least one of the output colors.

8. The projector according to claim 1, wherein the microdisplay devices are micromirror arrays.

9. The projector according to claim 2, wherein the microdisplay devices are micromirror arrays.

10. The projector according to claim 1, wherein the plurality of color beam splitters is configured to split a light beam into six primary color components.

11. The projector according to claim 10, wherein the six primary color components comprise a red color component, a green color component, a blue color component, a yellow color component, an orange color component, and a cyan color component.

12. The projector according to claim 2, wherein the plurality of color beam splitters is configured to split a light beam into six primary color components.

13. The projector according to claim 12, wherein the six primary color components comprise a red color component, a green color component, a blue color component, a yellow color component, an orange color component, and a cyan color component.

14. The projector according to claim 12, wherein a separate microdisplay device is micromirror array.

15. The projector according to claim 1, further comprising:
   a translucent rotatable drum having differently polarized sections;
   wherein the light beam is capable of being passed generally orthogonally through a wall of the drum.

16. The projector according to claim 2, further comprising:
   a translucent rotatable drum having differently polarized sections;
   wherein the light beam is capable of being passed generally orthogonally through a wall of the drum.

17. The projector according to claim 1, wherein the primary color components comprise a red color component, a green color component, a blue color component, a yellow color component, and a cyan color component.

18. The projector according to claim 2, wherein the primary color components comprise a red color component, a green color component, a blue color component, a yellow color component, and a cyan color component.

* * * * *